United States Patent [19]

Eichenberger et al.

[11] 4,438,663
[45] Mar. 27, 1984

[54] PLANETARY TRANSMISSION GEARING AND OUTPUT SHAFT RETENTION MEANS

[75] Inventors: Peter Eichenberger, Livonia; John H. Lodge, Westland, both of Mich.

[73] Assignee: Ford Motor Company, Dearborn, Mich.

[21] Appl. No.: 283,395

[22] Filed: Jul. 15, 1981

[51] Int. Cl.³ .............................................. F16H 57/10
[52] U.S. Cl. ........................................ 74/760; 74/761
[58] Field of Search ................. 74/760, 761; 308/219, 308/234, 235

[56] References Cited

U.S. PATENT DOCUMENTS

| | | | |
|---|---|---|---|
| 3,053,115 | 9/1962 | Cartwright et al. | 74/730 |
| 3,053,457 | 5/1962 | Cartwright | 74/730 |
| 3,241,398 | 3/1966 | Simpson et al. | 74/761 |
| 3,242,677 | 3/1966 | Kelley | 74/761 |
| 3,281,192 | 10/1966 | Daubenfeld | 308/219 |
| 3,309,939 | 3/1967 | Pierce | 74/472 |
| 3,527,121 | 9/1970 | Moore | 74/760 |
| 3,982,797 | 9/1976 | Tschirky et al. | 308/219 |
| 4,014,223 | 3/1977 | Pierce | 74/688 |
| 4,085,984 | 4/1978 | Cameron | 308/219 |

FOREIGN PATENT DOCUMENTS 1188381 10/1960 Fed. Rep. of Germany ...... 308/234

Primary Examiner—Leslie A. Braun
Assistant Examiner—D. Wright
Attorney, Agent, or Firm—Donald J. Harrington; Keith L. Zerschling

[57] ABSTRACT

A planetary gear arrangement for an automatic power transmission mechanism in an automotive driveline having rearward traction wheels and a forward engine wherein axial loads developed on the gearing due to thrust forces resulting from displacement of the rear vehicle suspension while the vehicle is accelerating or when it is operated over a rough road bed are transmitted directly to the case as the torque transmitting elements of the gearing are isolated from these thrust forces, and wherein provision is made for preloading thrust bearings in the gearing to accommodate axial displacement of the torque output shaft with respect to the other torque transmission elements of the gearing when the suspension is deflected and the geometry of the driveshaft and suspension system changes while the vehicle is operating under torque.

6 Claims, 2 Drawing Figures

| Gear | B3 | C1 | B1/B2 | C2 | OWC1 | OWC2 |
|---|---|---|---|---|---|---|
| 1st |  | X | X |  |  | X |
| 2nd |  |  | X | X | X | X |
| 3rd |  | X |  | X |  |  |
| Rev. | X | X |  |  |  |  |

PLANETARY TRANSMISSION GEARING AND OUTPUT SHAFT RETENTION MEANS

BRIEF DESCRIPTION OF THE INVENTION

Our invention relates to automatic power transmissions of the kind shown in U.S. Pat. Nos. 3,053,115 and 3,035,457. Other examples of prior art mechanisms to which the improvements of our invention may be applied are shown is U.S. Pat. Nos. 4,014,223 and 3,309,939, which are assigned to the assignee of this invention.

In an automatic transmission of the kind shown in the patents mentioned in the preceding paragraph a planetary gear system is used to establish a plurality of torque delivery paths between a hydrokinetic torque converter and an output shaft that is connected to the vehicle driveshaft through a universal joint. Such transmissions are used in rear wheel drive vehicles where the rearward end of the driveshaft is connected to a differential and axle assembly that forms a part of the rear vehicle suspension system. When the rear vehicle suspension system deflects, there is a tendency for thrust forces to be developed in the driveshaft; and these are transmitted through the output shaft into the transmission gearing. Such suspension deflections occur during acceleration of the vehicle because of a so-called spring windup as accelerating torque is applied to the traction wheels. Deflections occur also, of course, due to irregularities in the road surface which cause a vehicle jounce condition. If deflections of the rear suspension occur while the driveshaft is under torque, the spline connections between the driveshaft and the output shaft and between the output shaft and the gearing become loaded because movement of the output shaft relative to the gearing and movement of the driveshaft relative to the output shaft is resisted. This resistance is due to the friction in the splines in the presence of driving torque. The absence of spline slippage results in full thrust loads, and in prior art mechanisms these are transmitted to the gearing. These thrust loads must be accommodated by thrust washers in the gearing.

It is an object of our invention to eliminate or reduce the thrust loads on the gearing that occur because of rear suspension deflections. The torque delivery elements then need not be designed to accommodate large thrust forces. Inexpensive stampings, for example, may be used at certain strategic locations rather than a machined steel part; and simplified bushings may be used instead of high capacity radial needle thrust bearings. This reduces the cost of the transmission mechanism and also makes it possible to reduce the overall stack-up length of the transmission assembly.

In our improved transmission structure provision is made for isolating the thrust forces in the gearing and transmitting them directly to the transmission casing. My improved mechanism is adapted to accommodate thrust force distribution to the casing regardless of the direction of the thrust forces on the output shaft. Provision is made also for cushioning the gearing elements against displacement due to thrust forces on the output shaft by providing a yieldable, preloaded, main thrust ring assembly between the unitary planetary gear elements and an adjacent thrust surface of the transmission housing.

PARTICULAR DESCRIPTION OF THE INVENTION

Figure 1:
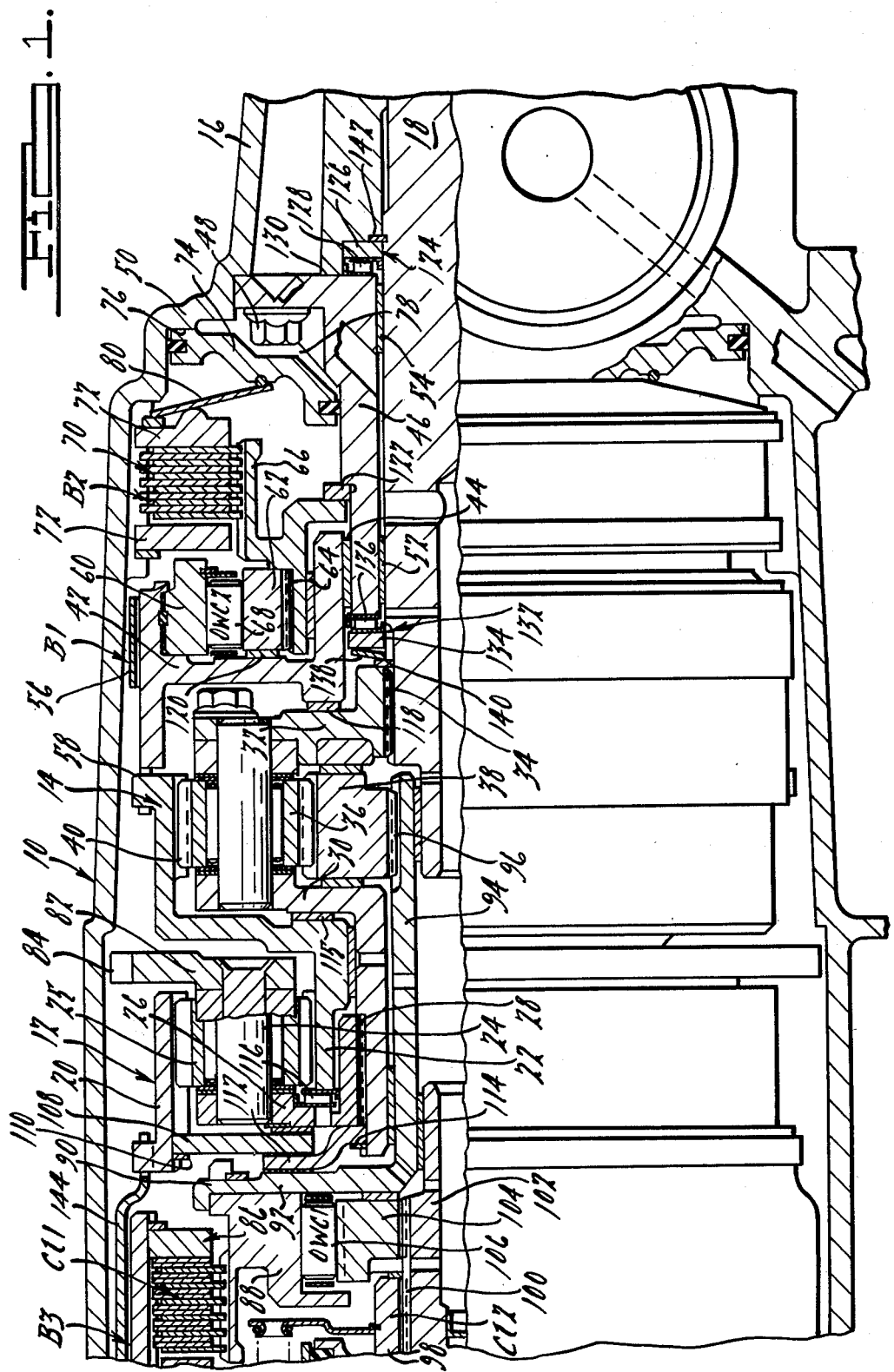
FIG. 1 is a cross-sectional view of a gear system embodying the improvements of our invention.

Numeral 10 in FIG. 1 designates generally a transmission casing. It includes a main gearing portion in which two simple planetary gear units 12 and 14 are situated. It includes also a tailshaft extension housing 16 that encloses a torque output shaft 18. The left-hand end of the assembly shown in FIG. 1 contains two clutches and one brake which establish driving connections with torque input members of the transmission assembly, such as a bladed turbine member for a fluid coupling or torque converter, the impeller of the coupling or converter being adapted to be driven by a vehicle engine in the manner taught in the prior art references referred to in this specification.

Gear unit 12 has elements comprising a ring gear 20, a sun gear 22 and a planet carrier 24. Planetary pinions 26 are journalled on the carrier 24 in meshing engagement with the ring gear 20 and the sun gear 22.

Carrier 24 includes a side member 25 that is splined at 28 to carrier 30 of the gear unit 14 thus establishing a direct connection between the carrier of each gear unit. The right-hand side of the carrier 30 comprises a side member 32 which is splined at 34 to the torque output shaft 18.

Gear unit 14 has elements comprising planetary pinions 36 journalled on the carrier shown at 30 and 32. These mesh with sun gear 38 and ring gear 40. Sun gear 22 is connected directly to ring gear 40, and the carriers 26 and 30 also are connected together through the spline 28.

Brake drum 42 is journalled on bushing 44 supported by stationary sleeve shaft 46 which forms a part of the transmission housing. Sleeve shaft 46 has a flange that is bolted at 48 to the rear housing wall 50. Sleeve shaft 46 surrounds the torque output shaft 18, the latter being journalled therein by bushings 52 and 54. A friction brake band 56 (B1) surrounding brake drum 42 can be applied and released to anchor selectively brake drum 42 and provide a reaction point for ring gear 40, the latter being keyed at 58 to the brake drum 42.

An outer clutch race 60 is carried by brake drum 42, and inner brake race 62 is splined at 64 to brake member 66. Overrunning brake rollers 68 are situated between the races and prevent rotation of the races relatively to each other in one direction and to permit freewheeling motion in the opposite direction. Brake member 66 carries brake discs which register with brake discs carried by casing 10 to form a multiple brake disc assembly 70 (B2). A brake reaction ring 72 also is carried by the casing and is located adjacent the brake discs of brake 70. A brake actuator ring 72 is adapted to compress the brake discs of the brake assembly 70 and it is actuated by a brake piston 74. An annular cylinder 76 receives the piston 74 and cooperates with it to define an annular pressure chamber 78. A Belleville spring disc 80 anchored at its other margin to the casing provides a force multiplying leverage for transferring clutch actuating forces from the piston 74 to the actuator ring 72.

The carriers for each gear unit 12 and 14 are connected to the output shaft 18. Carrier 24 includes a side member 82 formed with external brake teeth 84 which are adapted to engage a parking brake pawl, not shown, to lock the transmission in an inactive state when the vehicle is parked.

A first multiple disc clutch assembly 86 (C11) is adapted to establish a driving connection between the turbine of the torque converter or fluid coupling and clutch member 88 which is keyed at 90 to radial plate 92 of sun gear shaft 94. Sun gear 38 is splined at 96 to the sun gear shaft 94. A second clutch assembly (C12), not shown, is adapted to establish a driving connection between the turbine and clutch member 98 which is splined at 100 to a torque input sleeve shaft 102. This sleeve shaft is splined to an inner race for an overrunning coupling 104. Clutch member 88 forms an outer race for the overrunning coupling. The overrunning coupling includes clutch rollers 106 that are adapted to establish a driving connection between inner race 104 and coupling or clutch member 88 when torque is delivered therethrough in one direction, but the rollers will permit freewheeling motion between the races to prevent torque delivery in the opposite direction.

Ring gear 20 has splined thereto an externally splined plate in the form of a stamping 108. It is held axially fast on the ring gear 20 by a snap ring 110. Disposed directly adjacent the plate 108 is a thrust plate in the form of a stamping 112. This is internally splined to the external splines on the hub of carrier 30 to which the carrier 26 is splined. Snap ring 114 holds the plate 112 axially fast with respect to the carriers. The stampings 112 and 108 can rotate, one with respect to the other, when they are adapted to transmit thrust forces therethrough and to hold the elements of the gear unit 12 in assembled relationship.

A radial needle thrust bearing 116 is disposed between carrier 26 and the sun gear 22. Thrust washer 115 is situated between sun gear 22 and the adjacent carrier shown at 30 and 32. Sun gear 38 also has thrust washers on either side thereof to transmit axially directed forces between the carrier portions 30 and 32 and the sun gear 38. The forces acting on the carrier portion 32 in an axial direction are transmitted to the brake drum 42 through bushing 118. Another bushing 120 is located on the opposite side of the brake drum 42 and it is adapted to transmit forces between the brake drum 42 and the inner race 62 of the overrunning coupling shown in part at 68. Another thrust washer 122 is situated between a shoulder formed on stationary sleeve shaft 46 and the brake member 66.

A rear radial needle bearing thrust washer assembly is shown at 124. It includes a thrust ring 126, radial needle bearings 128 and a cage that is situated directly adjacent reaction surface 130 formed on the stationary sleeve shaft 46. A front radial needle bearing thrust washer assembly is shown at 132. It includes a thrust ring 134 and radial needle bearings 136 located between the thrust ring 134 and the left-hand end of the stationary sleeve shaft 46. A Belleville washer spring 138 has one margin thereof engaging the thrust ring 134. The inner margin of the Belleville washer spring 138 is secured to the output shaft 18 by snap ring 140.

When thrust forces acting in a right-hand direction on the output shaft 18 tend to shift the output shaft 18, the shifting motion is resisted by the Belleville spring 138 and the radial needle thrust washer assembly 132 so that a thrust force is transmitted directly to the casing through the stationary sleeve shaft 46. On the other hand, if the thrust forces acting on the output shaft 18 are directed in a left-hand direction, they are transmitted directly through the radial needle thrust washer assembly 124 to the casing. Thrust ring 126 of the assembly 124 is held axially fast by snap ring 142.

When the transmission is operating under torque and thrust forces on the output shaft 18 due to movement of the rear suspension over a rough road bed act in a right-hand direction, such outboard forces are transmitted through the yieldable thrust washer assembly 132. The spline 34, since it is subjected to torque, resists movement of the shaft 18 with respect to the carrier portion 32. The forces acting on the output shaft, however, are isolated from the gearing elements so that overloading of those elements is avoided as the thrust forces are distributed directly to the casing through the stationary sleeve shaft 46. The stack-up tolerances for the bushings 118, 120 and 122 can be designed so that such outbound thrust forces can be accommodated without assuming a zero clearance condition. Thus the outbound thrust forces will be distributed directly to the case as the Belleville washer 138 tends to assume a flat position. After the force is interrupted and the spline 34 is adapted to accommodate shifting movement of the output shaft 18 with respect to the carrier 32, the Belleville spring preload will cause the assembly to assume the position shown in FIG. 1. Inbound thrust forces, of course, are transmitted directly to the casing through the radial needle thrust bearing assembly 124.

During operation of the mechanism shown at FIG. 1, the clutch assembly 86 is engaged to establish first gear ratio. When it engaged, turbine torque that is delivered directly to the rear sun gear 38, brake assembly 70 is applied so that reaction torque is distributed from the ring gear 14 through the overrunning coupling 68 to the casing through the applied discs of the brake 70. The carrier then is driven in a forward driving direction at a reduced speed ratio.

To establish an intermediate drive ratio, the brake assembly 70 remains applied; and a second multiple disc, not shown, distributes torque to the clutch element 98 which is connected through structure, not shown, to torque transfer member 144. Turbine torque then is delivered to the ring gear 20, and the carrier of the gear unit 12 is driven in a forward direction at an increased speed ratio.

To establish a direct-drive, third speed ratio condition, both clutches of the ratio changing clutches are applied so that the elements of the gear units 12 and 14 rotate together in unison with the one to one ratio.

Figure 2:
FIG. 2 is a chart that shows the pattern for engagement and release of the friction clutches and brakes illustrated in FIG. 1 to effect various speed ratio changes.

To establish reverse drive, ring gear 20 is anchored by a brake band (B3), not shown, which is applied to the clutch members 98 and 144. Thus the sun gear 20 acts as a reaction member, and torque is delivered through the overrunning coupling 106 to the sun gear 96. A regenerative torque delivery path is established with the carrier rotating in a reverse direction the sequence of engagement and release of the clutches and brake is illustrated in FIG. 2.

By isolating the gear elements as we have shown the use of costly thrust washers can be avoided and simple thrust bearings can be substituted. This also eliminates the necessity for establishing lubrication lines for the thrust washer assemblies. The overall transmission mechanical efficiency is improved because of the elimination of the thrust forces acting on the gear elements which in turn reduces friction losses.

With our improved arrangement the most severe inbound and outbound thrust forces on the shaft 18 are distributed through the casing rather than to the transmission internal members caused by locking of the splines when the tranmission is operating under torque. It is possible, furthermore, to use simple stampings at 112 and at 108 rather than complex machined elements since these members are not subjected to loads caused by changes in driveshaft length. The thrust forces are most severe, of course, when the vehicle is fully loaded and accelerates over a rough roadbed.

Having thus described a preferred embodiment of our invention, what we claim and desire to secure by U.S. Letters Patent is:

1. In a planetary transmission for an automotive vehicle having aligned input and output shafts, a transmission case, said shafts being journalled within said case;
   planetary gearing within said case adapted to provide plural torque delivery paths between said input shaft and said output shaft;
   said output shaft having a splined connection with a torque output element of said planetary gearing;
   a first thrust reaction bearing assembly formed on said output shaft contacting a reaction wall on said casing whereby inbound thrust forces on said output shaft are transmitted directly to said casing;
   a second thrust reaction bearing assembly on said output shaft situated contacting another reaction wall on said case whereby outbound thrust forces on said output shaft are transmitted directly to said case; and
   spring means for cushioning the transfer of outbound thrust forces from said output shaft to said case through said second thrust reaction bearing assembly.

2. A planetary transmission as set forth in claim 1 wherein said gearing comprises a first simple planetary gear unit and a second simple planetary gear unit;
   each gear unit having elements comprising a ring gear, a sun gear, planet pinions engaged with their respective center ring gears and a carrier for journalling the pinions of each gear unit;
   a sun gear shaft splined to the sun gear of one of said gear units and arranged in alignment with the common axis of said input shaft and said output shaft and a spline connection between the carrier of said one gear unit with an element of the other gear unit.

3. The combination as set forth in claim 2 wherein said carriers are connected together;
   a first thrust plate extending in a radial direction and carried by the ring gear of said second gear unit;
   a second thrust plate extending in a radial direction adjacent said first thrust plate and splined to the carrier of said second gear unit whereby thrust forces can be transferred therethrough and whereby the gear elements of said gear units are contained in a unitary assembly as said radially disposed thrust plates prevent axial displacements of the elements of the gear units.

4. The combination as set forth in claim 1 wherein said first thrust reaction bearing assembly on said output shaft comprises a thrust ring secured to said output shaft against displacement in an inbound direction;
   a radial needle thrust bearing located between said thrust ring and said first reaction wall on said case;
   the second thrust reaction bearing assembly on said output shaft comprising a second thrust ring and another radial needle thrust bearing located between said second thrust ring and said second reaction wall of said case; and
   yieldable spring means for establishing a yieldable connection between said output shaft and said second thrust reaction bearing assembly whereby thrust forces in an outbound direction are transferred through said spring means to said case.

5. The combination as set forth in claim 2 wherein said first thrust reaction bearing assembly on said output shaft comprises a thrust ring secured to said output shaft against displacement in an inbound direction;
   a radial needle thrust bearing located between said thrust ring and said first reaction wall on said case;
   the second thrust washer assembly on said output shaft comprising a second thrust ring and another radial needle thrust bearing located between said second thrust ring and said second reaction wall of said case; and
   yieldable spring means for establishing a yieldable connection between said output shaft and said second thrust reaction bearing assembly whereby thrust forces in an outbound direction are transferred through said spring means to said case.

6. The combination as set forth in claim 3 wherein said first thrust reaction bearing assembly on said output shaft comprises a thrust ring secured to said output shaft against displacement in an inbound direction;
   a radial needle thrust bearing located between said thrust ring and said first reaction wall on said case;
   the second thrust reaction bearing assembly on said output shaft comprising a second thrust ring and another radial needle thrust bearing located between said second thrust ring and said second reaction wall of said case; and
   yieldable spring means for establishing a yieldable connection between said output shaft and said second thrust reaction bearing assembly whereby thrust forces in an outbound direction are transferred through said spring means to said case.

* * * * *